United States Patent [19]
Fitzi et al.

[11] 3,901,908
[45] Aug. 26, 1975

[54] 2-ALKYL- AND 2-CYCLOALKYL-4,5-BIS-PHENYL-IMIDAZOLES

[75] Inventors: Konrad Fitzi, Neuallschwil; Rudolf Pfister, Basel, both of Switzerland

[73] Assignee: Ciba-Geigy Corporation, Ardsley, N.Y.

[22] Filed: July 5, 1973

[21] Appl. No.: 376,760

Related U.S. Application Data

[63] Continuation-in-part of Ser. No. 102,131, Dec. 28, 1970, abandoned.

[52] U.S. Cl. .............................. 260/309; 424/275
[51] Int. Cl. ........................................ C07d 49/36
[58] Field of Search ...................... 102/131; 260/309

[56] References Cited
OTHER PUBLICATIONS
Carrara, et al., C.A. 40:7241, (1946).
Radziszewski, C.A. 4:2265–6, (1910).
Schubert, et al., C.A. 53:15061-2, (1959).
Novelli, et al., C.A. 38:2957, (1944).
Delzenne, et al., C.A. 71:39628b, (1969).
Neugebauer, et al., C.A. 56:3065, (1962).

*Primary Examiner*—Henry R. Jiles
*Assistant Examiner*—C. M. S. Jaisle
*Attorney, Agent, or Firm*—Joseph G. Kolodny; John J. Maitner; Theodore O. Groeger

[57] ABSTRACT

Compounds of the class of 2-alkyl- and 2-cycloalkyl-4,5-bis-phenyl-imidazoles, the phenyl groups of which being substituted by methoxy, methyl, hydroxy, methylsulfonyl and/or chloro, and pharmaceutically acceptable acid addition salts thereof have analgesic, antiphlogistic and antipyretic activity; as active ingredients of pharmaceutical compositions they can be used for the relief and removal of pain as well as for the treatment of rheumatic, arthritic and other inflammatory diseases.

13 Claims, No Drawings

2-ALKYL- AND 2-CYCLOALKYL-4,5-BIS-PHENYL-IMIDAZOLES

CROSS REFERENCE

This application is a continuation in part of Ser. No. 102, 131 filed Dec. 28, 1970, now abandoned.

DETAILED DESCRIPTION

The present invention relates to imidazole derivatives having valuable pharmacological properties, to processes for their production, to pharmaceutical compositions containing these compounds and to their use.

More particular, the present invention relates to compounds of the formula

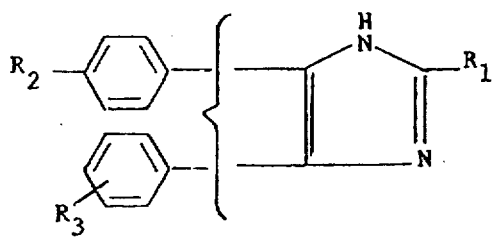

wherein
$R_1$ is alkyl of 2 to 6 carbon atoms or cycloalkyl of 3 to 6 carbon atoms,
$R_2$ is methoxy, methyl, hydroxy or methylsulfonyl, and
$R_3$ is methoxy, methyl, hydrogen or chloro, or the pharmaceutically acceptable acid addition salts thereof.

It has now been found that these new substances possess valuable pharmacological properties, especially analgesic, antiphlogistic, and antipyretic activity, combined with a favourable therapeutic index, and negligible gastrointestinal side effects. The following are mentioned as examples of such pharmacologically valuable compounds of formula I:

2-isopropyl-4,5-bis-(p-methoxyphenyl)-imidazole,
2-ethyl-4,5-bis-(p-methoxyphenyl)-imidazole,
2-cyclopropyl-4,5-bis-(p-methoxyphenyl)-imidazole,
2-tert.butyl-4(5)-[p-(methylsulphonyl)-phenyl]-5-(4)-phenyl-imidazole,
2-tert.butyl-4(5)-(p-hydroxyphenyl)-5(4)phenyl-imidazole,
2-tert.butyl-4,5-bis-(p-tolyl)-imidazole,
2-tert.butyl-4(5)-(p-methoxyphenyl)-5(4)-phenyl-imidazole,
2-tert.butyl-4(5)-(p-methoxyphenyl)-5(4)-(m-tolyl)-imidazole,
2-tert.butyl-4(5)-(p-methoxyphenyl)-5(4)-(o-tolyl)-imidazole,
2-tert.butyl-4(5)-(p-tolyl)-5(4)-phenyl-imidazole,
2-isopropyl-4(5)-phenyl-5(4-(p-methoxyphenyl)-imidazole and
2-isopropyl-4(5)-(p-tolyl)-5(4)-p-methoxyphenyl)-imidazole.

The analgesic activity of the new imidazole derivatives of the general formula I is demonstrated, for example, on the mouse by the method described by E. Siegmund, R. Cadmus and G. Lu, Proc. Soc. Exp. Biol. Med. 95, 729 (1957), whereby the amount of substance is determined which is required to prevent the syndrome produced by intraperitoneal injection of 2-phenyl-1,4-benzoquinone. The antiphlogistic activity of the new imidazole derivatives of the general formula I when administered orally is shown, for example, on rats in the bolus alba oedema test according to G. Wilhelmi, Jap. J. Pharmacol. 15, 187 (1965).

The antipyretic activity is determined by the compounds of the general formula I being administered orally, in suitable dosages, to groups of rats which had received, 16–18 hours previously, an intramuscular injection of a suspension of 15% of baker's yeast with 1% of tragacanth and 1% of sodium chloride in distilled water, the amount being 1 ml per 100 g of body weight. The fever temperatures produced by the yeast were measured rectally one hour and also half an hour before administration of the test substances, and then half-hourly from half an hour to 5 hours after administration of the test substances; and the maximum temperature fall as well as the arithmetical mean temperature fall during the 5 hours after administration of the test substances was determined as a basis of comparison in relation to the average of the two measurements taken before administration.

In the above described tests the compounds of the invention are demonstrated to be active in dosages of between about 1 and about 200 mg/kg. The toxicity of the compounds of the invention is of favourable low order.

The new imidazole derivatives of the general formula I and their pharmaceutically acceptable addition salts with inorganic and organic acids are suitable as active substances for medicaments which can be administered orally, rectally or parenterally for the relief and removal of pains of varying origin, as well as for the treatment of rheumatic, arthritic and other inflammatory diseases.

In the imidazole derivatives of the general formula I and in the corresponding starting materials given below, $R_1$ is, e.g. the ethyl, propyl, isopropyl, butyl, sec.-butyl, tert.butyl, pentyl, isopentyl, tert.pentyl, neopentyl, 1-methylbutyl, 1-ethylpropyl, hexyl, isohexyl, 1-methylpentyl, 1-ethylbutyl or 1,1-dimethylbutyl group, the cyclopropyl, cyclobutyl, cyclopentyl, or cyclohexyl group.

The new imidazole derivatives of the general formula I and their acid addition salts are produced by condensing a substituted benzil of the general formula II:

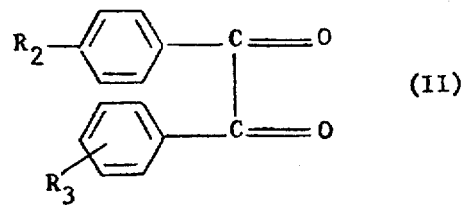

wherein $R_2$ and $R_3$ have the meanings given under formula I with the, at least, double molar amount of ammonia, and/or a greater excess of formamide, and an aldehyde of the general formula III:

wherein $R_1$ has the meaning given under formula I; and, optionally converting the obtained imidazole derivative into an addition salt with an inorganic or organic acid. For example, condensation is performed with ammonia n a lower alkanoic acid, especially acetic acid or formic acid, or in a carboxylic acid $R_1$—COOH, at the boiling temperature of the reaction mixture, and the ammonia is used in a large excess in the form of the corresponding alkanoic acid salt. The aldehyde can be used in an amount which is substantially equimolar with respect to the substituted benzil of the general formula II, or it can also be used in excess, in order to obtain the most favourable result in a particular case, taking into account the accessibility of the starting materials and ease of purification of the final material. The reaction time is generally between one and 24 hours. Purification of the free imidazole derivatives obtained by the aforementioned process or by further processes, is performed, e.g. by recrystallisation from benzene, toluene, or a lower alkanol. If necessary, the imidazole derivatives melting mostly above 100°C are subsequently dried, for the removal of crystal-solvent, in high vacuum at 100°C and higher. A further possibility of obtaining pure imidazole derivatives is the conversion (dealt with in more detail below) of a crude product into an acid addition salt, optionally recrystallisation of the latter and, finally, again liberation of the imidazole derivative of the general formula I.

According to a modification of the aforementioned process, a substituted benzil of the general formula II heated with a larger excess of formamide and with an aldehyde of the general formula III to 180° to 200°C; and, optionally, the obtained imidazole derivative is converted into an addition salt with an inorganic or organic acid. In the case of this process modification, a part of the formamide decomposes to ammonia, and hence renders possible the formation of the imidazole derivatives of the general formula I, analogously to the first mentioned embodiment. The reaction is carried out, e.g. by refluxing for 2–6 hours a substituted benzil of the general formula II with the equimolar amount, or with an excess, of aldehyde of the general formula III formamide, the amount of formamide being approximately 5 to 25 times that of the two other reactants; or with a mixture of formamide and dimethylformamide.

According to a second process, the imidazole derivatives of the general formula I and their acid addition salts are produced by condensing a substituted benzoin of the general formula IV:

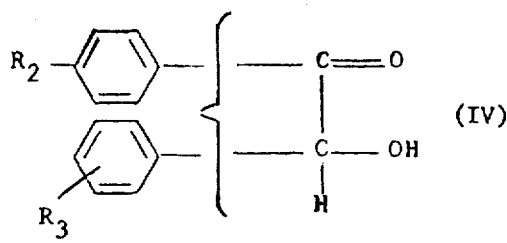

wherein $R_2$ and $R_3$ have the meanings given under formula I, in the presence of an oxidising agent usual for conversion of the substituted benzoin into the correspondingly substituted benzil, with the, at least, double molar amount of ammonia, and with an aldehyde of the above given general formula III in which $R_1$ has the meaning given under formula I; and, optionally, converting the obtained imidazole derivative into an addition salt with an inorganic or organic acid. Preferably used as oxidising agent is an organic copper (II)-salt such as copper(II)-acetate or -citrate, whereby the formed imidazole derivative of the general formula I precipitates as copper salt, and can be filtered off. The ammonia is preferably used in a large excess, and oxidation and simultaneous condensation are preferably performed, e.g. in a lower alkanol, such as methanol or ethanol, at 30° to 100°C or at the boiling temperature of the alkanol. The reaction duration is preferably between half an hour and 10 hours; for example, the reaction components are boiled for ca. 4 hours in methanol. The desired imidazole derivative is liberated, from the directly obtained copper salt, in the usual manner, e.g. by reaction with hydrogen sulphide in a lower alkanol in the heat.

According to a third process; the imidazole derivatives of the general formula I and their acid addition salts are obtained by reacting in the heat an amide of the general formula V:

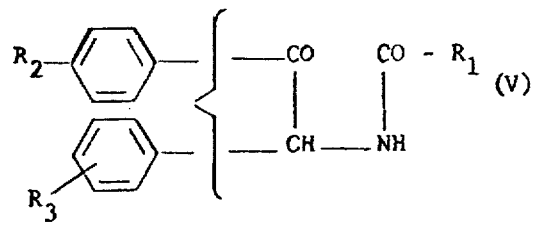

wherein $R_1$, $R_2$ and $R_3$ have the meaning given under formula I with an ammonium salt of a lower alkanoic acid or with formamide; and, optionally, converting the obtained imidazole derivative into an addition salt with an inorganic or organic acid. For example, an amide of the general formula V is refluxed with excess ammonium acetate in glacial acetic acid, or with excess ammonium formiate in formic acid, for one to ca. 24 hours; or it is heated with excess formamide for ca. 2–6 hours to 180° to 200°C, whereby the desired ring closure is effected by partial decomposition of the formamide with liberation of ammonia. In certain cases, better yields are obtained by performing condensation, instead of with ammonium acetate in glacial acetic acid, with the ammonium salt of alkanoic acid $R_1$-COOH in this acid as the reaction medium.

The starting materials of the general formula V are produced, e.g. by acylation of 2-amino-2-phenylacetophenones containing in one phenyl group in p-position the methoxy or methyl group, and in the other phenyl group either no substituents or, in any position, the methoxy or methyl group, e.g. 2-amino-4'-methoxy-2-phenylacetophenone or 2-amino-4'-methoxy-2-(p-methoxyphenyl)-acetophenone, with alkanoic acid chlorides having 3–7 carbon atoms, or with cycloalkanecarbonyl chlorides having 4–7 carbon atoms, or with the corresponding acyl bromides or anhydrides.

A fourth process for the production of the imidazole derivatives of the general formula I and their acid addition salts consists in condensing a reactive ester of a substituted benzoin of the above given general formula IV wherein $R_2$ and $R_3$ have the meanings given under formula I with an amidine of the general formula VI:

wherein R₁ has the meaning given under formula I; and, optionally, converting the obtained imidazole derivative into an addition salt with an inorganic or organic acid. Condensation can be effected by the reactants being merely heated in an inert solvent at moderately elevated temperatures, e.g. by boiling in chloroform.

In order to avoid liberation of the amidines from their more stable hydrochlorides before the reaction, the reaction is advantageously performed in a two-phase system consisting of a solution of a reactive ester of the substituted benzoin, e.g. bromide, in an inert organic solvent such as, e.g. chloroform, and an aqueous solution of the hydrochloride of an amidine of the general formula VI. With heating and vigorous stirring, diluted aqueous potassium or sodium hydroxide solution, in overall the double-molar amount, is added dropwise in order, on the one hand, to liberate the amidine and, on the other hand, to bind the acid being liberated on ring closure. Suitable reactive esters of the substituted benzoins of the general formula IV are, in particular, the bromides and chlorides, and also esters of lower alkanesulphonic acids and arenesulphonic acids, such as methanesulphonic acid esters and p-toluenesulphonic acid esters. Mentioned as examples of such starting materials are 2-halogen-2-phenylacetophenones substituted in p-position of the one phenyl group and, optionally, also in any desired position of the other phenyl group by a methoxy or methyl group, such as 2-bromo- and 2-chloro-4'-methoxy-2(p-methoxyphenyl)-acetophenone, 2-bromo- and 2-chloro-4'-methoxy-2-phenylacetophenone, 2-bromo- and 2-chloro-2-(p-methoxyphenyl)-acetophenone, 2-bromo- and 2-chloro-4'-methyl-2-(p-tolyl)-acetophenone, 2-bromo- and 2-chloro-4'-methyl-2-phenylacetophenone, as well as 2-bromo-and 2-chloro-2-(p-tolyl)-acetophenone.

According to a fifth process, the compounds of the general formula I are obtained by heating an oxazole of the general formula VII:

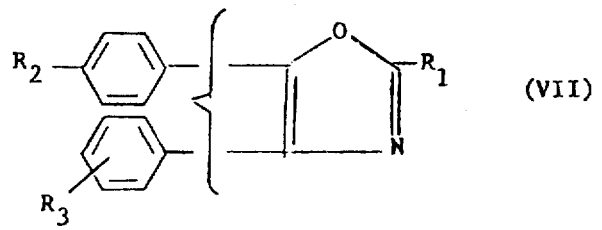

wherein R₁, R₂ and R₃ have the meanings given under formula I with ammonia and/or formamide. For example, an oxazole of the general formula VII is heated with a mixture of liquid ammonia and formamide in an autoclave to temperatures of ca. 180°C to 220°C, or a mixture of the stated oxazole with formamide is heated, for some time, e.g. one to 10 hours, to the boiling or decomposition temperature of the formamide.

The oxazoles of the general formula VII serving as starting materials are, for their part, new compounds. They are produced, e.g. by firstly reacting benzoins of the above given general formula IV substituted corresponding to the definition for R₂ and R₃ with halides of alkanoic acids having 3–7 carbon atoms, or cycloalkanecarboxylic acids having 4–7 carbon atoms, to give the corresponding esters. These are allowed to react with an ammonium salt of a lower alkanoic acid in the heat; for example, they are refluxed with excess ammonium acetate in glacial acetic acid for ca. 2–10 hours, whereby the desired oxazole is formed.

According to a further process, the oxazoles of the general formula VII are obtained by allowing an amide of the above given general formula V wherein R₁, R₂ and R₃ have the meanings given under formula I to react with a dehydrating agent. For example, the stated amides are refluxed with thionyl chloride in the presence or absence of an inert solvent such as, e.g. benzene, until the evolution of hydrogen chloride has ceased; or concentrated sulphuric acid is allowed to act for a short time at temperatures of 0°C to room temperature.

A third access to the oxazoles of the general formula VII consists in reacting an alkanoic acid nitrile having 3–7 carbon atoms, or a cycloalkanecarbonitrile having 4–7 carbon atoms, with a substituted benzoin of the above given general formula IV wherein R₂ and R₃ have the meanings given under formula I, in the presence of a mineral acid. For example, concentrated sulphuric acid is allowed to act on an equimolar mixture of the stated starting materials for a short time at temperatures between 0° and 30°C, or polyphosphoric acid for ca. 30 minutes to several hours at ca. 80° to 120°C.

Further processes for the production of oxazoles of the general formula VII are the condensation of reactive esters, especially hydrohalic acid esters, of benzoins of the general formula IV with alkanoic acid amides having 3–7, or cycloalkanecarboxamides having 4–7 carbon atoms, by heating to temperatures between ca. 130° and 170°C; and also the reaction of the stated reactive esters of benzoins of the general formula IV with tin(IV)-chloride complexes of the already mentioned alkanoic acid nitriles having 3–7 carbon atoms, or cycloalkanecarbonitriles having 4–7 carbon atoms, at room temperature to ca. 100°C.

The imidazole derivatives of the general formula I obtained by the process according to the invention are subsequently optionally converted, in the usual manner, into their addition salts with inorganic and organic acids. For example, to a solution of an imidazole derivative of the general formula I in an organic solvent is added the acid desired as salt component, or a solution of the acid. Preferably chosen for the reaction are organic solvents in which the formed salt does not readily dissolve, so that it can be separated by filtration; or to a solvent having a good dissolving power is added one having appreciably lower dissolving power. Suitable solvents or solvent combinations are, e.g. methanol, acetone methyl ethyl ketone, ethyl acetate, or acetone/ethanol, methanol/ether, ethanol/ether, or ethyl acetate/ether. Furthermore, it is also possible to dissolve equimolar or equivalent amounts of an imidazole of the general formula I and of the acid desired as salt component in one of the aforementioned solvents, and to concentrate the solution in vacuo.

Moreover, it is possible to produce hydrochlorides, e.g. by intensive shaking or stirring of an organic solution of an imidazole derivative of the general formula I, e.g. an ethyl acetate solution, with moderately concentrated aqueous hydrochloric acid, and recrystallisation of the precipitated crude hydrochlorides, e.g. from ethanol.

For use as medicaments it is possible to use, instead of the free imidazole derivatives, pharmaceutically acceptable acid addition salts, i.e. salts with such acids of which the anions are not toxic in the dosage amounts concerned. Furthermore, it is of advantage if the salts to be used as medicaments crystallise well and are not, or only slightly, hygroscopic. For salt formation with imidazole derivatives of the general formula I it is possible to use, e.g. hydrochloric acid, hydrobromic acid, sulphuric acid, phosphoric acid, methanesulphonic acid, ethanesulphonic acid, $\beta$-hydroxyethanesulphonic acid, acetic acid, malic acid, tartaric acid, citric acid, lactic acid, oxalic acid, succinic acid, fumaric acid, maleic acid, benzoic acid, salicyclic acid, phenylacetic acid, madelic acid and embonic acid.

The new imidazole derivatives of the general formula I and their pharmacologically acceptable acid addition salts are preferably administered orally or rectally. The dosage depends on the mode of administration, on the species and age, and on the individual condition. The daily dosages of the free imidazole derivatives, or of pharmaceutically acceptable salts thereof, vary between 0.5 mg/kg and 50 mg/kg for mammals. Suitable dosage units such as dragees, tablets, suppositories or ampoules, preferably contain an imidazole derivative of the general formula I, or a pharmaceutically acceptable acid addition salt thereof, in an amount of 0.25 – 5 mg/kg of body weight of the species to be treated.

Dosage units for oral administration preferably contain as active substance between 10 and 90% of a compound of the general formula I, or of a pharmaceutically acceptable salt of such a compound. They are produced by combining the active substance, e.g. with solid pulverulent carriers such as, lactose, saccharose, sorbitol, mannitol, starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragee cores. The dragee cores are coated, e.g. with concentrated sugar solutions which may also contain, e.g. gum arabic, talcum and/or titanium dioxide; or they are coated with a lacquer dissolved in readily volatile organic solvents or mixtures of solvents. Dyestuffs can be added to these coatings, e.g. for identification of the various dosages of active substance. Further suitable oral dosage units are hard gelatine capsules as well as soft closed capsules made from gelatine and a softener, such as glycerol. The hard gelatine capsules preferably contain the active substance as a granulate in admixture with lubricants such as talcum or magnesium stearate, and, optionally, stabilisers such as sodium metabisulphite ($Na_2S_2O_5$), or ascorbic acid. In soft capsules, the active substance is preferably dissolved or suspended in suitable liquids such as liquid polyethylene glycols, whereby likewise stabilisers may be added.

Suitable dosage units for rectal administration are, e.g. suppositories consisting of a combination of an active substance with a suppository foundation substance based on natural or synthetic triglycerides (e.g. cocoa butter), polyethylene glycols or suitable higher fatty alcohols; and gelatine rectal capsules containing a combination of of the active substance with polyethylene glycols.

Further suitable means of administration are, e.g. lotions, tinctures and ointments, prepared with the usual auxiliaries, for percutaneous administration.

The following prescriptions further illustrate the production of a number of typical preparations:

a. An amount of 1000 g of 2-ethyl-4,5-bis-(p-methoxyphenyl)-imidazole is mixed with 550 g of lactose and 292 g of potato starch; the mixture is then moistened with an alcoholic solution of 8 g of gelatine, and granulated through a sieve. After drying of the granulate, 60 g of potato starch, 60 g of talcum and 10 g of magnesium stearate and 20 g of highly dispersed silicon dioxide are mixed in, and the mixture is pressed to form 10,000 tablets each weighing 200 mg and each containing 100 mg of active substance. If required, the tablets may be provided with grooves for a more precise adjustment of the dosage amount. As active substances, it is also possible to use, e.g. 500 g of 2-tert.butyl-4(5)-(p-methoxyphenyl)-5(4)-phenyl-imidazole, or 500 g of 2-cyclopropyl-4,5-bis-(p-methoxyphenyl)-imidazole, whereby 10,000 tablets each weighing 150 mg and each containing 50 mg of active substance are obtained.

b. An amount of 100 g of 2-isopropyl-4,5-bis-(p-methoxyphenyl)-imidazole is well mixed with 16 g of maize starch and 6 g of highly dispersed silicon dioxide. The mixture is moistened with a solution of 2 g of stearic acid, 6 g of ethyl cellulose and 6 g of stearin in ca. 70 ml of isopropyl alcohol; and then granulated through a sieve III (Ph. Helv. V). The granulate is dried for ca. 14 hours, and then put through sieve III-IIIa. It is afterwards mixed with 16 g of maize starch, 16 g of talcum and 2 g of magnesium stearate, and the mixture pressed to form 1000 dragee cores. These are coated with a concentrated syrup of 2 g of lacca, 7.5 g of gum arabic, 0.15 g of dyestuff, 2 g of highly dispersed silicon dioxide, 25 g of talcum and 53.35 g of sugar, and then dried. The obtained dragee each weigh 260 mg and each contain 100 mg of active substance. It is also possible to use as active substance, e.g. the same amount of 2-ethyl-4,5-bis-(p-methoxyphenyl)-imidazole.

c. An amount of 50 g of 2-cyclopropyl-4,5-bis-(p-methoxyphenyl)-imidazole and 1950 g of finely ground suppository foundation substance (e.g. cocoa butter) is thoroughly mixed and then melted. From the melt, maintained homogeneous by stirring, are poured 1000 suppositories each weighing 2 g. Each suppository contains 50 mg of active substance.

d. 60 g of polyoxyethyleneanhydrosorbit-monostearate, 30 g of anhydrosorbit-monostearate, 150 g of paraffin oil and 120 g of stearyl alcohol are melted together; to the melt are added 50 g of 2-tert.butyl-4(5)-(p-hydroxyphenyl)-5(4)-phenyl-imidazole (finely ground), and 590 ml of preheated water at 40° are then added to form an emulsion. The emulsion is stirred until it has cooled to room temperature, and then filled into tubes.

The following examples further illustrate the production of the new imidazole derivatives of the general formula I, but the examples in no way limit the scope of the invention. The temperatures are given in degrees Centrigrade.

EXAMPLE 1 a. The mixture of 13.5 g (0.050 mole) of p-anisil, 3.96 g (0.055 mole) of isobutyraldehyde, 27.0 g (0.35 mole) of ammonium acetate and 130 ml of glacial acetic acid is refluxed for 15 hours, and subsequently poured, with vigorous stirring, into a mixture of 350 g of ice and 270 ml of concentrated aqueous ammonia solution. The crystal mass is extracted with ethyl acetate, and the organic phase washed neutral with saturated sodium chloride solution, dried with sodium sulphate, and concentrated by evaporation. The residue is recrystallised from ethyl acetate, and dried in high vacuum at 100°. Thus obtained is 2-isopropyl-4,5-bis-(p-methoxyphenyl)-imidazole as white crystals, M.P. 195°–196°. Yield 8.8 g, 55% of the theoretical value.

The following imidazole derivatives are obtained analogously by using, instead of the isobutyraldehyde, 0.055 mole of the corresponding aldehydes:

2-ethyl-4,5-bis-(p-methoxyphenyl)-imidazole, M.P. 170°–172° (from toluene), with 3.19 g of propionaldehyde;

2-propyl-4,5-bis-(p-methoxyphenyl)-imidazole, M.P. 180°–182° (from ethyl acetate), with 3.96 g of butyraldehyde;

2-butyl-4,5-bis-(p-methoxyphenyl)-imidazole, M.P. 175°–176° (from ethyl acetate), with 4.73 g of valeraldehyde;

2-isobutyl-4,5-bis-(p-methoxyphenyl)-imidazole, M.P. 166°–168° (from benzene), with 4.73 g of isovaleraldehyde;

2-tert.butyl-4,5-bis-(p-methoxyphenyl)-imidazole, M.P. 167°–168° (from benzene), with 4.73 g of pivaldehyde;

2-pentyl-4,5-bis-(p-methoxyphenyl)-imidazole, M.P. 137°–138° (from ethyl acetate), with 5.50 g of hexanal;

2-hexyl-4,5-bis-(p-methoxyphenyl)-imidazole, M.P. 145°–147° (from toluene), with 6.27 g of heptanal;

2-(1,1-dimethylbutyl)-4,5-bis-(p-methoxyphenyl)-imidazole, M.P. 120°–121° (from toluene/petroleum ether), with 6.27 g of 2,2-dimethylvaleraldehyde;

2-cyclopropyl-4,5-bis-(p-methoxyphenyl)-imidazole, M.P. 189°–191° (from toluene), with 3.85 g of cyclopropanecarboxaldehyde;

2-cyclohexyl-4,5-bis-(p-methoxyphenyl)-imidazole, M.P. 194°–195° (from benzene), with 6.16 g of cyclohexanecarboxaldehyde.

Likewise analogously obtained are the following imidazoles by condensation of 0.050 mole of the stated substituted benzils with 0.055 mole of the stated aldehydes:

2-ethyl-4(5)-(p-methoxyphenyl)-5(4)-phenyl-imidazole, M.P. 161°–163° (from toluene), from 12.0 g of 4-methoxybenzil and 3.19 g of propionaldehyde;

2-isopropyl-4(5)-(p-methoxyphenyl)-5(4)-phenyl-imidazole, M.P. 189°–191° (from toluene), from 12.0 g of 4-methoxybenzil and 3.96 g of isobutyraldehyde;

2-butyl-4(5)-(p-methoxyphenyl)-5(4)-phenyl-imidazole, M.P. 162°–163° (from ethanol), with 12.0 g of 4-methoxybenzil and 4.73 g of valeraldehyde;

2-cyclopropyl-4(5)-(p-methoxyphenyl)-5(4)-phenyl-imidazole, M.P. 162°–163° (from toluene), from 12.0 g of 4-methoxybenzil and 3.85 g of cyclopropanecarboxaldehyde;

2.tert.butyl-4,5-bis-(p-tolyl)-imidazole, M.P. 204°–206° (from toluene), from 11.9 g of p-tolil and 4.73 g of pivaldehyde;

2-isopropyl-4(5)-(p-tolyl)-5(4)-phenyl-imidazole, M.P. 209°–210° (from toluene), from 11.2 g of 4-methylbenzil and 3.96 g of isobutyraldehyde;

2-tert.butyl-4(5)-(p-tolyl)-5(4)-phenyl-imidazole, M.P. 154°–156° (from toluene), from 11.2 g of 4-methylbenzil and 4.73 g of pivalaldehyde;

2-tert.butyl-4(5)-(p-methoxyphenyl)-5(4)-(p-tolyl)-imidazole, M.P. 171°–173° (from toluene), from 12.7 g of 4-methoxy-4'-methylbenzil [see (b) below] and 4.73 g of pivaldehyde;

2-tert.butyl-4(5)-(p-methoxyphenyl)-5(4)-(m-tolyl)-imidazole, M.P. 185°–187° (from toluene), from 12.7 g of 4-methoxy-3'-methylbenzil [see (a) and (b) below] and 4.73 g of pivalaldehyde;

2-tert.butyl-4-(5)-(p-methoxyphenyl)-5(4)-(o-tolyl)-imidazole, M.P. 156°–158° (from toluene), from 12.7 g of 4-methoxy-2'-methylbenzil [see (a) and (b) below] and 4.73 g of pivalaldehyde.

The substituted benzils required for the last three imidazoles are produced as follows:

b. An amount of 48 g of powdered aluminium chloride is added portionwise at −2° to 10°, within 45 minutes, to the mixture of 50.0 g (0.3 mole) of (m-tolyl)-acetyl chloride, 39.0 g (0.36 mole) of anisole and 195 ml of carbon disulphide. The red mixture is stirred for 20 minutes at 0° to 10°, and subsequently for 90 minutes at 20°–25°. It is then refluxed for 15 minutes, cooled and poured on to a mixture of 500 g of ice and 100 ml of 5-n hydrochloric acid; it is then allowed to stand and, after 2 hours, extracted with benzene. The organic phase is washed with 5-n hydrochloric acid and saturated sodium chloride solution, dried over sodium sulphate, and concentrated by evaporation. The obtained 4'-methoxy-2-(m-tolyl)-acetophenone melts, after recrystallisation from ethanol, at 64°–66°.

4'-Methoxy-2-(o-tolyl)-acetophenone, M.P. 88°–90° (from ethanol) is produced analogously using 50.0 g (0.3 mole) of (o-tolyl)-acetyl chloride.

c. The solution of 24.0 g (0.10 mole) of 4'-methoxy-2-(m-tolyl)-acetophenone in 250 ml of dimethylsulphoxide and 7.5 ml of concentrated hydrogen bromide is stirred for 10 hours at 70°–80°, and subsequently poured into 3 litres of water. The yellow suspension is extracted with ethyl acetate; the organic phase is washed with saturated sodium chloride solution, dried over sodium sulphate, and concentrated by evaporation. Thus obtained is 4-methoxy-3'-methylbenzil, M.P. 55°–57° (from ethanol).

The following are produced analogously:
4-methoxy-4'-methylbenzil, M.P. 108°–110° (from ethanol), starting with 24.0 g of 4'-methoxy-2-(p-tolyl)-acetophenone [M.P. 90° – 90.5° (from ethanol), cp. J. Amer. Chem. Soc. 76, 3721–3722 (1954)];

4-methoxy-2'-methylbenzil, M.P. 111°–113° (from ethanol), starting with 24.0 g of 4'-methoxy-2-(o-tolyl)-acetophenone.

EXAMPLE 2

The mixture of 11.5 g(0.048 mole) of 4-methoxybenzil, 5.45 g (0.063 mole) of pivalaldehyde, 50.0 g (0.65 mole) of ammonium acetate and 100 ml of glacial acetic acid is refluxed for 15 hours, and subsequently poured, with vigorous stirring, into a mixture of 300 g of ice and 240 ml of conc. aqueous ammonia solution. The crystal mass is extracted with ethyl acetate, the organic phase washed with saturated sodium chloride solution until neutral, dried with sodium sulphate, and concentrated by evaporation. The residue is crystallised from toluene, and dried in high vacuum at 10°, whereby 2-tert.butyl-4(5)-(p-methoxyphenyl)-5(4)-phenyl-imidazole, M.P. 193°–194°, is obtained.

EXAMPLE 3

A mixture of 4.0 g (0.015 mole) of p-anisil, 1.08 g (0.015 mole) of isobutyraldehyde and 100 ml of formamide is refluxed for 3 hours, and subsequently poured into 200 ml of water. The dark precipitate is filtered off under suction, and taken up in chloroform. The insoluble part is filtered off, and the organic phase separated, dried over sodium sulphate, and concentrated by evaporation. After recrystallisation from ethyl acetate is obtained 2-isopropyl-4,5-bis-(p-methoxyphenyl)-imidazole, M.P. 195°–196°.

EXAMPLE 4

An amount of 50.0 g (0.18 mole) of p-anisoin is dissolved, with heating, in 750 ml of methanol. To the solution are added, at 30° – 35°, 36.6 g (0.18 mole) of copper(II)-acetate-monohydrate, followed by 14.4 g (0.20 mole) of isobutyraldehyde. Within 10 minutes are added dropwise 375 ml of concentrated aqueous ammonia solution; the solution is then refluxed for 3 hours, and filtered hot. The copper salt of the desired imidazole, obtained as suction-filter residue, is washed twice with 50 ml of hot methanol each time, and afterwards suspended in 1000 ml of 80% ethanol. The ethanolic suspension is saturated at 80° with hydrogen sulphide; and after 3 hours stirring at 80°, the hot suspension is filtered off under suction to remove the copper sulphide. The filtrate is concentrated by evaporation, the residue recrystallised from ethyl acetate, and dried in high vacuum at 100°. The obtained 2-isopropyl-4,5-bis-(p-methoxyphenyl)-imidazole melts at 195°–196°.

a. The following are produced analogously from 0.18 mole of the correspondingly substituted benzoins and 0.20 mole of the corresponding aldehydes:

2-ethyl-4,5-bis-(p-methoxyphenyl)-imidazole, M.P. 170°–172° (from toluene), starting with 50 g of p-anisoin and 11.6 g of propionaldehyde;

2-propyl-4,5-bis-(p-methoxyphenyl)-imidazole, M.P. 180°–182° (from ethyl acetate), starting with 50 g of p-anisoin and 14.4 g of butyraldehyde;

2-butyl-4,5-bis-(p-methoxyphenyl)-imidazole, M.P. 175°–176° (from ethyl acetate), starting with 50 g of p-anisoin and 17.2 g of valeraldehyde;

2-isobutyl-4,5-bis-(p-methoxyphenyl)-imidazole, M.P. 166°–168° (from benzene), starting with 50 g of p-anisoin and 17.2 g of isovaleraldehyde;

2-pentyl-4,5-bis-(p-methoxyphenyl)-imidazole, M.P. 137°–138° (from ethyl acetate), starting with 50 g of p-anisoin and 20.0 g of hexanol;

2-cyclopropyl-4,5-bis-(p-methoxyphenyl)-imidazole, M.P. 189°–191° (from toluene), starting with 50 g of p-anisoin and 14.0 g of cyclopropanecarboxaldehyde;

2-cyclohexyl-4,5-bis-(p-methoxyphenyl)-imidazole, M.P. 194°–195° (from benzene), starting with 50 g of p-anisoin and 22.4 g of cyclohexanecarboxaldehyde;

2-isopropyl-4(5)-(p-methoxyphenyl)-5(4)-phenyl-imidazole, M.P. 189°–191° (from toluene), starting with 43.2 g of 4-methoxybenzoin and 14.4 g of isobutyraldehyde;

2-butyl-4(5)-(p-methoxyphenyl)-5(4)-phenyl-imidazole, M.P. 162°–163° (from ethanol), starting with 43.2 g of 4-methoxybenzoin and 17.2 g of valeraldehyde;

2-tert.butyl-4(5)-(p-methoxyphenyl)-5(4)-phenyl-imidazole, M.P. 193°–194° (from toluene), starting with 43.2 g of 4-methoxybenzoin and 17.2 g of pivalaldehyde;

2-cyclopropyl-4(5)-(p-methoxyphenyl)-5(4)-phenyl-imidazole, M.P. 192°–193° (from toluene), starting with 43.2 g of 4-methoxybenzoin and 14.0 g of cyclopropanecarboxaldehyde;

2-tert.butyl-4,5-bis-(p-tolyl)-imidazole, M.P. 204°–206° (from toluene), starting with 42.8 g of p-toluoin and 17.2 g of pivalaldehyde.

b. The following further compounds may also be prepared analogously:

2-tert.butyl-4(5)-(p-hydroxyphenyl)-5(4)-phenyl-imidazole, M.P. 190°–192°, starting with 41.0 g of 4'-hydroxybenzoin and 17.2 g of pivalaldehyde;

2-tert.butyl-4(5)-(p-methoxyphenyl)-5(4)-(p-chlorophenyl)-imidazole, M.P. 148°–150°, starting with 49.8 g of 4-methoxy-4'-chlorobenzoin and 17.2 g of pivalaldehyde.

2-tert.butyl-4(5)-(p-methylsulphonylphenyl)-5(4)-phenylimidazole, M.P. 215°–217°, starting with 52.2 g of 4-methylsulphonylbenzoin and 17.2 g of pivalaldehyde;

The last-mentioned starting material: 4-methylsulphonyl-benzoin, is produced as follows: An amount of 80 g. (0.227 mole) of 2-bromo-4'-methylsulphonyl-2-phenylacetophenone is refluxed together with 80 g. of sodium acetate and 900 ml. of glacial acetic acid for 5 hours. The reaction mixture is concentrated in a rotary evaporator, taken up in ether, and washed with water. The organic phase is briefly shaken with 2-n sodium hydroxide solution; it is subsequently washed with ice-cold dilute hydrochloric acid solution, dried over sodium sulphate, and concentrated by evaporation. The residue is recrystallised from ethylacetate/ether/petroleum ether, M.P. 116°–119°.

EXAMPLE 5

An amount of 7.10 g (0.020 mole) of N-[4-methoxy-α-(p-methoxyphenyl)-phenacyl]-valeramide [cp. a)] is refluxed with 13.1 g (0.17 mole) of ammonium acetate in 60 ml of glacial acetic acid for 14 hours. The brown solution is then poured on to 120 ml of concentrated ammonia and 120 g of ice, and extracted with ethyl acetate. The organic phase is separated, washed with saturated sodium chloride solution until neutral, dried over sodium sulphate, and concentrated by evaporation. The residue is crystallised from ethyl acetate, whereby 5.31 g (79% of the theoretical value) of 2-butyl-4,5-bis-(p-methoxyphenyl)-imidazole, M.P. 175°–176°, are obtained.

The following imidazoles are obtained analogously, using 0.020 mole of the corresponding amides:

2-ethyl-4,5-bis-(p-methoxyphenyl)-imidazole, M.P. 170°–172° (from toluene), from 6.54 g of N-[4-methoxy-α-(p-methoxyphenyl)-phenacyl]-propionamide;

2-isopropyl-4,5-bis-(p-methoxyphenyl)-imidazole, M.P. 195°–196° (from ethyl acetate), from 6.82 g of N-[4-methoxy-α-(p-methoxyphenyl)-phenacyl]-isobutyramide;

2-isobutyl-4,5-bis-(p-methoxyphenyl)-imidazole, M.P. 166°–168° (from benzene), from 7.10 g of N-

[4-methoxy-α-(p-methoxyphenyl)-phenacyl]-isovaleramide;

2-hexyl-4,5-bis-(p-methoxyphenyl)-imidazole, M.P. 145°-147° (from toluene), from 7.66 g of N-[4-methoxy-α-(p-methoxyphenyl)-phenacyl]-heptanamide; 2-(1,1-dimethylbutyl)-4,5-bis-(p-methoxyphenyl)-imidazole, M.P. 120°-121° (from toluene/petroleum ether), from 7.66 g of N-[4-methoxy-α-(p-methoxyphenyl)-phenacyl]-2,2-dimethyl-valeramide;

2-cyclopropyl-4,5-bis-(p-methoxyphenyl)-imidazole, M.P. 189°-191° (from toluene), from 6.78 g of N-[4-methoxy-α-(p-methoxyphenyl)-phenacyl]-cyclopropanecarboxamide;

2-ethyl-4(5)-(p-methoxyphenyl)-5(4)-phenyl-imidazole, M.P. 161°-163° (from toluene), from 5.94 g of N-(4-methoxy-α-phenyl-phenacyl)-propionamide;

2-isopropyl-4(5)-(p-methoxyphenyl)-5(4)-phenyl-imidazole, M.P. 189°-191° (from toluene), from 6.22 g of N-(4-methoxy-α-phenyl-phenacyl)-isobutyramide;

2-tert.butyl-4(5)-(p-methoxyphenyl)-5(4)-phenyl-imidazole, M.P. 193°-194° (from toluene), from 6.50 g of N-(4-methoxy-α-phenyl-phenacyl)-pivalamide;

2-cyclopropyl-4(5)-(p-methoxyphenyl)-5(4)-phenyl-imidazole, M.P. 192°-193° (from toluene), from 6.18 g of N-(4-methoxy-α-phenyl-phenacyl)-cyclopropanecarboxamide;

2-tert.butyl-4,5-bis-(p-tolyl)-imidazole, M.P. 204°-206° (from toluene), from 6.46 g of N-[4-methyl-α-(p-tolyl)-phenacyl-pivalamide;

2-tert.butyl-4,5-bis-(p-methoxyphenyl)-imidazole, M.P. 167°-168° (from benzene), from 7.10 g of N-[4-methoxy-α-(p-methoxy-phenyl)-phenacyl]-pivalamide.

b. The following further compounds may also be prepared analogously:

2-tert.butyl-4(5)-(p-methylsulphonylphenyl)-5(4)-phenyl-imidazole, M.P. 215°-217°, from 7.1 g of N-(4-methylsulphonyl-α-phenyl-phenacyl)-pivalamide;

2-tert.butyl-4(5)-(p-hydroxyphenyl)-5(4)-phenyl-imidazole, M.P. 190°-192°, from 6.2 g of N-(4-hydroxy-α-phenyl-phenacyl)-pivalamide;

2-tert.butyl-4(5)-(p-methoxyphenyl)-5(4)-(p-chlorophenyl)-imidazole, M.P. 148°-150°, from 7.2 g of N-[4-methoxy-α-(p-chlorophenyl)-phenacyl]-pivalamide.

The starting materials are produced as follows:

c. An amount of 11 g (0.036 mole) of 2-amino-4'-methoxy-2-(p-methoxyphenyl)-acetophenone-hydrochloride [produced according to G. Drehfahl and M. Hartmann, Ann. 589, 82-90 (1954), by reduction of p-anisil-monoxime] is suspended in 100 ml of abs. benzene. After the addition of 4.0 g (0.04 mole) of triethylamine, 4.72 g (0.04 mole) of valeryl chloride in 10 ml of absolute benzene are added dropwise, with ice cooling and within 15 minutes, in a manner to ensure that the internal temperature does not exceed 20°. After another 10 minutes, a further 4.0 g (0.04 mole) of triethylamine are added dropwise, and the suspension is stirred for 14 hours at 20°-25°; water is subsequently added, and the suspension then diluted with ethyl acetate. The organic phase is separated, washed with water, 2-n sodium carbonate solution, saturated sodium chloride solution, and 2-n hydrochloric acid. The residue, obtained after a further neutral washing with saturated sodium chloride solution, drying over sodium sulphate, and concentration by evaporation, is recrystallised from ethanol. The obtained N-[4-methoxy-α-(p-methoxyphenyl)-phenacyl]-valeramide melts at 90°-92°; yield 7.5 g, 59% of the theoretical value. For further processing it is also possible to use, instead of the crystallised product, the evaporation residue.

Obtained analogously are the following amides by acylation of 11.0 g (0.036 mole) of 2-amino-4'-methoxy-2-(p-methoxyphenyl)-acetophenone-hydrochloride with 0.040 mole of the corresponding acid chlorides:

N-[4-methoxy-α-(p-methoxyphenyl)-phenacyl]-propionamide, M.P. 100°-102° (from benzene), with 3.70 g of propionyl chloride;

N-[4-methoxy-α-(p-methoxyphenyl)-phenacyl]-isobutyramide, M.P. 125°-127° (from benzene), with 4.26 g of isobutyryl chloride;

N-[4-methoxy-α-(p-methoxyphenyl)-phenacyl]-isovaleramide, M.P. 104°-106° (from benzene), with 4.82 g of isovaleryl chloride;

N-[4-methoxy-α-(p-methoxyphenyl)-phenacyl]-heptanamide, M.P. 98°-100° (from ethanol/ether), with 5.94 g of heptanoyl chloride;

N-[4-methoxy-α-(p-methoxyphenyl)-phenacyl]-2,2-dimethylvaleramide, M.P. 75°-77° (from benzene/cyclohexane), with 5.94 g of 2,2-dimethyl-valeryl chloride;

N-[4-methoxy-α-(p-methoxyphenyl)-phenacyl]-cyclopropanecarboxamide, M.P. 136°-139° (from ethanol), with 4.18 g of cyclopropanecarbonyl chloride.

Obtained analogously are also the following amides by acylation of 10.0 g (0.036 mole) of 2-amino-4'-methoxy-2-phenylacetophenone -hydrochloride [cp. b) and c) below] with 0.040 mole of the corresponding acid chlorides:

N-(4-methoxy-α-phenyl-phenacyl)-propionamide, M.P. 99°-102° (from ethyl acetate/petroleum ether), with 3.70 g of propionyl chloride;

N-(4-methoxy-α-phenyl-phenacyl)-isobutyramide (crude product) with 4.26 g of isobutyryl chloride;

N-(4-methoxy-α-phenyl-phenacyl)-pivalamide (crude product) with 4.82 g of pivalyl chloride;

N-(4-methoxy-α-phenyl-phenacyl)-cyclopropanecarboxamide, M.P. 155°-157° (from benzene), with 4.18 g of cyclopropanecarbonyl chloride.

Likewise analogously are obtained:

N-[4-methyl-α-(p-tolyl)-phenacyl]-pivalamide (crude product) using 9.92 g (0.036 mole) of 2-amino-4'-methyl-2-(p-tolyl)-acetophenone-hydrochloride [cp. b) and c)] and 4.82 g of pivalyl chloride;

N-[4-methoxy-α-(p-methoxyphenyl)-phenacyl]-pivalamide, M.P. 99°-101° (from ethanol), using 11.0 g of 2-amino-4'-methoxy-2-(p-methoxyphenyl)-acetophenone-hydrochloride and 4.82 g of pivalyl chloride.

d. Analogously are obtained:

N-(4-methylsulphonyl-α-phenylphenacyl)-pivalamide, M.P. 155°-157° (from toluene), using 12.0 g. of 2-amino-4'-methylsulphonyl-2-phenyl-acetophenone-hydrochloride and 5.2 g. of pivaloyl chloride, whereby the corresponding amino ketone hydrochloride is obtained as follows: An amount of 14.5 g. (0.053 mole) of 4'-methylsulphonyl-2-phenyl-acetophenone is dissolved in 450 ml. of ethylene dichloride; the solution is heated to 35° and, within 20 minutes, a solution of 8.6 g. of bromine in 20 ml. of ethylene dichloride added dropwise. The reaction mixture is subsequently stirred for 2 hours at 20°–25°, and then concentrated in a rotary evaporator. The residue is recrystallised from alcohol. 2-Bromo-4'-methylsulphonyl-2-phenyl-acetophenone is obtained as white crystals, M.P. 158°–160°. [Obtained analogously is 2-bromo-4'-methylsulphonyl-2-(p-methoxyphenyl)-acetophenone, M.P. 126°–129°, starting with 5.0 g. of 4'-methylsulphonyl-2-(p-methoxyphenyl)-acetophenone and 2.64 g. of bromine]. An amount of 7.0 g. (0.02 mole) of 2-bromo-4'-methylsulphonyl-2-phenyl-acetophenone is stirred with 2.94 g. (0.02 mole) of hexamethylene tetramine in 100 ml. of ethylene dichloride for 24 hours at 20°–25°. The white precipitate is filtered off under suction and the suction-filter-residue taken up in 80 ml. of abs. alcohol; to the mixture are added 20 ml. of concentrated hydrochloric acid, and the whole stirred for 2 hours at 20°–25° and then for 3 hours at 0°–5°. The white crystals are filtered off, taken up in water, and the suspension is made alkaline with 2-n sodium carbonate solution. The white suspension is extracted with ether. The organic phase is dried over sodium sulphate, and ethereal hydrochloric acid solution is added, whereby the desired 2-amino-4'-methylsulphonyl-2-phenyl-acetophenone-hydrochloride precipitates as white crystals, M.P. 212°–214°.

The two amino ketone hydrochlorides not known hitherto are produced as follows:

c. Hydrogen chloride is passed at 20°–25° into a suspension of 34.0 g (0.15 mole) of 4'-methoxy-2-phenyl-acetophenone in 800 ml of ether. After 30 minutes, 9.5 ml of freshly distilled butyl nitrite are added dropwise within 25 minutes. The flow of hydrogen chloride is stopped after a further 4 hours; the reaction mixture is then allowed to stand for ca. 15 hours, and afterwards filtered. The filtrate is extracted three times with ice-cooled 2-n sodium hydroxide solution. The aqueous alkaline solution is neutralised, with ice cooling, using dilute hydrochloric acid, and then extracted with ethyl acetate. The organic phase is washed neutral with saturated sodium chloride solution, dried over sodium sulphate, and concentrated by evaporation. The residue is crystallised from ethanol, whereby 4'-methoxy-2-oximino-2-phenyl-acetophenone, M.P. 116°–118°, is obtained.

4'-Methyl-2-oximino-2-(p-tolyl)-acetophenone is produced analogously starting with 33.7 g (0.15 mole) of 4'-methyl-2-)p-tolyl)-acetaphenone.

f. To the solution of 34.0 g (0.133 mole) of 4'-methoxy-2-oximino-2-phenyl-acetophenone in 300 ml of ethanol and 100 ml of dioxane is added dropwise at 0°–25°, within 30 minutes, a solution of 146.4 g of tin-(II)-chloride in 288 ml of concentrated hydrochloric acid. The reaction mixture is stirred for one week at 0°–25°, and subsequently poured into a mixture of 2 kg of ice and 2.5 litres of 5-n sodium hydroxide solution. The white mixture is extracted with ether, and the organic phase washed with saturated sodium chloride solution, and dried over sodium sulphate. From the filtered organic phase is precipitated, with ethereal hydrogen chloride solution, the hydrochloride of 2-amino-4'-methoxy-2-phenyl-acetophenone, M.P. 234°–236° (from ethanol).

2-Amino-4'-methyl-2-(p-tolyl)-acetophenone-hydrochloride is produced analogously, starting with 33.7 g (0.133 mole) of 4'-methyl-2-oximino-2-(p-tolyl)-acetophenone.

EXAMPLE 6

To a solution of 8.38 g (0.025 mole) of 2-bromo-4'-methoxy-2-(p-methoxyphenyl)-acetophenone in 40 ml of chloroform are added 3.68 g (0.03 mole) of isobutyramidine-hydrochloride in 15 ml of water. The solution of 2.9 g (0.06 mole) of potassium hydroxide in 15 ml of water is added dropwise, with vigorous stirring and introduction of nitrogen, to the emulsion at 15°–20°, the whole refluxed for 4–5 hours, and then poured still hot into a separating funnel. The lower organic phase is separated, washed with 2-n sodium carbonate solution and saturated sodium chloride solution, dried over sodium sulphate, and concentrated by evaporation. The residue is recrystallised from ethyl acetate, and dried in high vacuum at 100°, whereby 2-isopropyl-4,5-bis-(p-methoxyphenyl)-imidazole, M.P. 195°–196° is obtained.

The following imidazoles are obtained in an analogous manner by using, instead of isobutyramidine-hydrochloride, 0.03 mole of the corresponding amidine hydrochlorides:

2-ethyl-4,5-bis-(p-methoxyphenyl)-imidazole, M.P. 170°–172° (from toluene), with 3.26 g of propionamidine-hydrochloride;

2-isobutyl-4,5-bis-(p-methoxyphenyl)-imidazole, M.P. 166°–168° (from benzene), with 4.10 g of isovaleramidine-hydrochloride;

2-hexyl-4,5-bis-(p-methoxyphenyl)-imidazole, M.P. 145°–147° (from toluene), with 4.94 g of heptanamidine-hydrochloride;

2-cyclopropyl-4,5-bis-(p-methoxyphenyl)-imidazole, M.P. 189°–191° (from toluene), with 3.62 g of cyclopropanecarboxamidine-hydrochloride.

Likewise analogously obtained are the following imidazoles:

2-isopropyl-4(5)-(p-methoxyphenyl)-5(4)-phenyl-imidazole, M.P. 189°–191° (from toluene), starting with 7.63 g (0.025 mole) of 2-bromo-4'-methoxy-2-phenyl-acetophenone and 3.68 g (0.030 mole) of isobutyramidine-hydrochloride;

2-tert.butyl-4(5)-(p-methoxyphenyl)-5(4)-phenyl-imidazole, M.P. 193°–194° (from toluene), starting with 7.63 g (0.025 mole) of 2-bromo-4'-methoxy-2-phenyl-acetophenone, or the same amount of 2-bromo-2-(p-methoxyphenyl)-acetophenone and 4.10 g (0.030 mole) of pivalamidine-hydrochloride;

2-cyclopropyl-4(5)-(p-methoxyphenyl)-5(4)-phenyl-imidazole, M.P. 192°–193° (from toluene), starting with 7.63 g (0.025 mole) of 2-bromo-4'-methoxy-2-phenyl-acetophenone and 3.62 g (0.030 mole) of cyclopropanecarboxamidine-hydrochloride;

2-tert.butyl-4,5-bis-(p-tolyl)-imidazole, M.P. 204°–206° (from toluene), starting with 7.58 g (0.025 mole) of 2-bromo-4'-methyl-2-(p-tolyl)-acetophenone and 4.10 g (0.030 mole) of pivalamidine hydrochloride.

b. The following further compounds may also be produced analogously:

2-tert.butyl-4(5)-(p-methylsulphonylphenyl)-5(4)-phenyl-imidazole, M.P. 215°–217°, starting with 8.83 g (0.025 mole) of 2-bromo-4'-methylsulphonyl-2-phenyl-acetophenone and 4.10 g (0.030 mole) of pivalamidine-hydrochloride;

2-tert.butyl-4(5)-(p-hydroxyphenyl)-5(4)-phenyl-imidazole, M.P. 190°–192°, starting with 7.28 g (0.025 mole) of 2-bromo-4'-hydroxy-2-phenyl-acetophenone and 4.10 g (0.030 mole) of pivalamidine-hydrochloride;

2-tert.butyl-4(5)-(p-methoxyphenyl)-5(4)-(m-chlorophenyl)-imidazole, M.P. 169°–171°, starting with 8.48 g (0.025 mole) of 2-bromo-4'-methoxy-2-(m-chlorophenyl)-acetophenone and 4.10 g (0.030 mole) of pivalamidine-hydrochloride.

2-Tert.butyl-4(5)-(p-methylsulphonylphenyl)-5(4)-(p-methoxyphenyl)-imidazole, M.P. 205°–207°, starting with 9.6 g. (0.025 mole) of 2-bromo-4'-methylsulphonyl-2-(p-methoxyphenyl)-acetophenone and 4.10 g. (0.030 mole) of pivalamidine-hydrochloride.

EXAMPLE 7

An amount of 9.27 g (0.03 mole) of 2-ethyl-4,5-bis-(p-methoxyphenyl)-oxazole is heated with 97 g of liquid ammonia and 64 g of formamide in an autoclave for 5 hours to 200° (The internal pressure rises to 185 atm.). After cooling, the reaction mixture is poured into water, and extracted with ethyl acetate. The organic phase is separated, washed until neutral with saturated sodium chloride solution, and afterwards shaken with 10 ml of 1-n hydrochloric acid. The insoluble hydrochloride of the desired imidazole is filtered off under suction, recrystallised from ethanol (M.P. 195°–197°), suspended in ethyl acetate, and shaken with aqueous ammonia. The organic phase is separated, dried over sodium sulphate, and concentrated by evaporation. The residue is recrystallised from ethanol, whereby 2-ethyl-4,5-bis-(p-methoxyphenyl)-imidazole, M.P. 170°–172° is obtained.

a. The following imidazoles are obtained in an analogous manner by using, instead of 2-ethyl-4,5-bis-(p-methoxyphenyl)-oxazole, 0.03 mole of the corresponding oxazoles:

2-isopropyl-4,5-bis-(p-methoxyphenyl)-imidazole, M.P. 195°–196° (from ethyl acetate), from 9,69 g of 2-isopropyl-4,5-bis-(p-methoxyphenyl)-oxazole;

2-isobutyl-4,5-bis-(p-methoxyphenyl)-imidazole, M.P. 166°–168° (from benzene), from 10.11 g of 2-isobutyl-4,5-bis-(p-methoxyphenyl)-oxazole;

2-tert.butyl-4,5-bis-(p-methoxyphenyl)-imidazole, M.P. 167°–168° (from benzene), from 10.11 g of 2-tert. butyl-4,5-bis-(p-methoxyphenyl)oxazole;

2-hexyl-4,5-bis-(p-methoxyphenyl)-imidazole, M.P. 145°–147°°(from toluene), from 10.95 g of 2-hexyl-4,5-bis-(p-methoxyphenyl)-oxazole;

2-cyclopropyl-4,5-bis-(p-methoxyphenyl)-imidazole, M.P. 189°–191° (from toluene), from 9.61 g of 2-cyclopropyl-4,5-bis-(p-methoxyphenyl)-oxazole;

2-isopropyl-4(5)-(p-methoxyphenyl)-5(4)-phenyl-imidazole, M.P. 189°–191° (from toluene), from 8.79 g of 2-isopropyl-4-(p-methoxyphenyl)-5-phenyl-oxazole;

2-tert.butyl-4(5)-(p-methoxyphenyl)-5(4)-phenyl-imidazole, M.P. 193°–194° (from toluene), from 9.21 g of 2-tert. butyl-4-(p-methoxyphenyl)-5-phenyl-oxazole;

2-cyclopropyl-4(5)-(p-methoxyphenyl)-5(4)-phenyl-imidazole, M.P. 192°–193° (from toluene), from 8.73 g of 2-cyclopropyl-4-(p-methoxyphenyl)-5-phenyl-oxazole;

2-tert.butyl-4,5-bis-(p-tolyl)-imidazole, M.P. 204–206° (from toluene), from 9.15 g of 2-tert.butyl-4,5-bis-(p-tolyl)-oxazole.

b. The following further compounds may also be produced analogously:

2-tert.butyl-4(5)-(p-methylsulphonylphenyl)-5(4)-phenyl-imidazole, M.P. 215°–217°, from 10.65 g of 2-tert.butyl-4-(p-methylsulphonylphenyl)-5-phenyl-oxazole;

2-tert.butyl-4(5)-(p-hydroxyphenyl)-5(4)-phenyl-imidazole, M.P. 190°–192°, from 8.49 g of 2-tert.butyl-4-(p-hydroxyphenyl)-5-phenyl-oxazole;

2-tert.butyl-4(5)-(p-methoxyphenyl)-5(4)-(p-chlorophenyl)-imidazole, M.P. 148°–150°, from 10.45 g of 2-tert.butyl-4-(p-methoxyphenyl)-5-(p-chlorophenyl)-oxazole.

The oxazoles required as starting materials are produced, for example, as follows:

c. To the mixture of 13.60 g (0.05 mole) of p-anisoin, 10 ml of triethylamine and 100 ml of abs. benzene is added dropwise, at 40° initial temperature, a solution of 6.5 g (0.07 mole) of propionyl chloride in 20 ml of abs. benzene. The internal temperature thereby rises to ca. 70°. The suspension is stirred for 5 hours at 50°; 50 ml of water are then added, and stirring proceeds for one hour at 20°–25°. To the suspension are then added 100 ml of ethyl acetate, and the mixture is washed successively with 2-n hydrochloric acid, water, 2-n sodium carbonate solution, and saturated sodium chloride solution. The organic phase is separated, dried with sodium sulphate, and then concentrated by evaporation, whereby crude p-anisoin-propionic acid ester remains behind.

d. The crude p-anisoin-propionic acid ester obtained according to (a) is refluxed with 25 g of ammonium acetate and 100 ml of glacial acetic acid for 5 hours. The hot reaction solution is subsequently poured on to a mixture of 250 g of ice and 200 ml of concentrated aqueous ammonia solution, and thereupon extracted with ethyl acetate. The organic phase is washed with 2-n hydrochloric acid and saturated sodium chlroide solution, dried, and concentrated by evaporation. The residue is crystallised from ethanol, whereby 2-ethyl-4,5-bis-(p-methoxyphenyl)-oxazole, M.P. 83°–85°, is obtained. Instead of the recrystallised substance, it is also possible for the crude product to be further processed.

The following are obtained analogously to (c) and (d):

2-isopropyl-4,5-bis-(p-methoxyphenyl)-oxazole, M.P. 80°–81° (from ethanol), starting with 13.60 g (0.05 mole) of p-anisoin and 7.5 g (0.07 mole) of isobutyryl chloride;

2-isobutyl-4,5-bis-(p-methoxyphenyl)-oxazole (crude product), starting with 13.60 g (0.05 mole of p-anisoin and 8.5 g (0.07 mole) of isovaleryl chloride;

2-tert.butyl-4,5-bis-(p-methoxyphenyl)-oxazole, M.P. 79°–80° (from petroleum ether), starting with 13.60 g (0.05 mole) of p-anisoin and 8.5 g (0.07 mole) of pivaloyl chloride;

2-hexyl-4,5-bis-(p-methoxyphenhl)-oxazole (crude product), starting with 13.60 g (0,05 mole) of p-anisoin and 10.4 g (0.07 mole) of heptanoyl chloride;

2-cyclopropyl-4,5-bis-(p-methoxyphenyl)-oxazole, M.P. 113°–114° (from methanol), starting with 13.60 g (0.05 mole) of p-anisoin and 7.4 g (0.07 mole) of cyclopropanecarbonyl chloride;

2-isopropyl-4-(p-methoxyphenyl)-5-phenyl-oxazole, M.P. 58°–59° (from petroleum ether), starting with 12.10 g (0.05 mole) of 4-methoxybenzoin and 7.5 g (0.07 mole) of isobutyryl chloride;

2-tert.butyl-4-(p-methoxyphenyl)-5-phenyl-oxazole (crude product), starting with 12.10 g (0.05 mole) of 4-methoxybenzoin and 8.5 g (0.07 mole) of pivaloyl chloride;

2-cyclopropyl-4-(p-methoxyphenyl)-5-phenyl-oxazole (crude product), starting with 12.10 g (0.05 mole) of 4-methoxybenzoin and 7.4 g (0.07 mole) of cyclopropanecarbonyl chloride;

2-tert.butyl-4,5-bis-(p-tolyl)-oxazole, M.P. 128°–130° (from petroleum ether), starting with 12.0 g (0.05 mole) of p-toluoin and 8.5 g (0.07 mole) of pivaloyl chloride.

e. The following further compounds may also be prepared analogously:

2-tert.butyl-4-(p-methylsulphonylphenyl)-5-phenyl-oxazole, starting with 14.5 g (0.05 mole) of 4-methylsulphonylbenzoin and 8.5 g of pivaloyl chloride;

2-tert.butyl-4-(p-hydroxyphenyl)-5-phenyl-oxazole, starting with 11.4 g (0.05 mole) of 4-hydroxybenzoin and 17.0 g of pivaloyl chloride;

2-tert.butyl-4-(p-methoxyphenyl)-5-(p-chlorophenyl)-oxazole, starting with 13.8 g (0.05 mole) of 4-methoxy-4'-chlorobenzoin and 8.5 of pivaloyl chloride.

EXAMPLE 8

To a solution of 30.84 g (0.10 mole) of 2-ethyl-4,5-;-(p-methoxyphenyl)-imidazole in 900 ml of acetone ε added at 20°–25° 9.61 g (6.5 ml, 0.10 mole) of ethane sulphonic acid, and stirring then proceeds for . 15 hours. The white crystals are filtered off under ction. After recrystallisation from ethanol/ether, the tained 2-ethyl-4,5-bis-(p-methoxyphenyl)-idazolemethanesulphonate melts at 149°–151°.

EXAMPLE 9

An amount of 15.0 g of 2-isopropyl-4,5-bis-(p-:thoxyphenyl)-imidazole is taken up in 400 ml of ıyl acetate and 100 ml of ether, and filtered. The filte is shaken with 70 ml of 2-n hydrochloric acid in eparating funnel. The precipitated hydrochloride is :n filtered off under suction, and the suction-filter idue dried for ca. 6 hours in high vacuum at 80°; it ıfterwards recrystallised from abs. ethanol/ether, and ıin dried, at 110°, under high vacuum. The obtained sopropyl-4,5-bis-(p-methoxyphenyl)-imidazole-ırochloride melts at 264°–267°.

EXAMPLE 10

The mixture of 5.8 g (0.02 mole) of 4-methylsul-phonylbenzil, 1.7 g (0.02 mole) of pivalaldehyde, 10.0 g (0.13 mole) of ammonium acetate and 50 ml of glacial acetic acid is reflux for 15 hours, and subsequently poured, with vigorous stirring, on to 150 g of ice. The yellow solution is rendered slightly alkaline with aqueous ammonia solution, and extracted with ethyl acetate. The organic phase is separated, dried over sodium sulphate, and concentrated by evaporation. The residue is recrystallised from toluene, and dried under high vacuum at 110°, whereby 2-tert.butyl-4(5)-[p-(methylsulphonyl)-phenyl]-5(4)-phenyl-imidazole, M.P. 215°–217°, is obtained.

The following is obtained analogously:

2-isopropyl-4(5)-[p-(methylsulphonyl)-phenyl]-5-(4)-phenyl-imidazole, M.P. 207°–208° (from toluene), starting with 5.8 g (0.02 mole) of 4-methylsulphonyl-benzil and 1.4 g (0.02 mole of isobutyraldehyde.

EXAMPLE 11

The mixture of 4.5 g (0.02 mole) of 4-hydroxybenzil, 1.72 g (0.02 mole) of pivalaldehyde, 10.0 g (0.13 mole) of ammonium acetate and 60 ml of glacial acetic acid is refluxed for 18 hours, and subsequently poured, with vigorous stirring, into a mixture of 150 g of ice and 120 ml of concentrated aqueous ammonia solution. The crystal mass is extracted with ethyl acetate, the organic phase washed until neutral with saturated sodium chloride solution, dried over sodium sulphate, and concentrated by evaporation. The residue is crystallised from ethyl acetate/petroleum ether, and dried under high vacuum at 110°, whereby 2-tert.butyl-4(5)-(p-hydroxyphenyl)-5(4)-phenyl-imidazole, M.P. 190°–192°, is obtained.

The following are obtained analogously:

2-tert.butyl-4(5)-(p-methoxyphenyl)-5(4)-(p-hydroxyphenyl)-imidazole, M.P. 216°–218° from ether/pentane;
starting with 5.1 g (0.02 mole) of 4-hydroxy-4'-methoxybenzil and 1.72 g (0.02 mole) of pivalaldehyde;

2-tert.butyl-4(5)-(p-hydroxyphenyl)-5(4)-(m-tolyl)-imidazole, M.P. 227°–228° from toluene/cyclohexane;
starting with 4.8 g (0.2 mole) of 4-hydroxy-3'-methylbenzil and 1.72 g (0.02 mole) of pivalaldehyde;

2-tert.butyl-4(5)-(p-hydroxyphenyl)-5(4)-(m-chlorophenyl)-imidazole, M.P. 238°–240° from toluene/cyclohexane;
starting with 5.2 g (0.02 mole) of 4-hydroxy-3'-chlorobenzil and 1.72 g (0.02 mole) of pivalaldehyde.

The starting materials for the two last-mentioned compounds are obtained as follows:

The mixture of 9.5 g of 4-methoxy-3'-chlorobenzil, 50 ml of glacial acetic acid and 100 ml of 48% hydrogen bromide is refluxed for 20 hours, and subsequently poured into water. The thus obtained suspension is extracted with ether. The organic phase is washed three times with 2-n sodium carbonate solution, dried over sodium sulphate, and concentrated by evaporation. The residue is recrystallised from ether/petroleum ether. The thus purified 4-hydroxy-3'-chlorobenzil melts at 154°–155°.

4-Hydroxy-3'-methylbenzil, M.P. 120–121° (from ether/petroleum ether), is obtained analogously, starting with 14.5 g of 4-methoxy-3'-methylbenzil.

EXAMPLE 12

The mixture of 1.0 g of 4-methylsulphonyl-4'-methoxybenzil, 0.3 g of pivalaldehyde 2.0 g of ammonium acetate and 30 ml of glacial acetic acid is refluxed for 14 hours, and subsequently poured, with vigorous stirring, on to 100 g of ice. The yellow solution is rendered weakly alkaline with ammonia, and extracted with ethyl acetate. The organic phase is separated, dried over sodium sulphate, and concentrated by evaporation. The residue is recrystallised from alcohol/cyclohexane, and dried under high vacuum at 110°, whereby 2-tert.butyl-4(5)-[p-(methylsulphonyl)-phenyl]-5(4)-(p-methoxyphenyl)-imidazole, M.P. 205°–207°, is obtained.

The starting materials are obtained as follows:
a.             4'-methylthio-2-(p-methoxyphenyl)-acetophenone To the mixture of 50 g of thioanisole, 92.5 g of 4-methoxyphenylacetic acid chloride and 360 ml of tetrachloroethane are added in portions at 0°–5°, within 30 minutes, 69.4 g of aluminium chloride. The reaction mixture is firstly stirred for 7 hours at 0°–5°, and then for 10 hours at 20°–25°. The black mass is subsequently poured on to a mixture of ice and concentrated hydrochloric acid, the whole well stirred, and allowed to stand overnight. The organic lower phase is then separated and concentrated in a rotary evaporator. The residue is dissolved in boiling alcohol and, with stirring, slowly cooled. The solution is separated from the dark oil initially precipitating. On further cooling is obtained crystalline 4'-metehylthio-2-(p-methoxyphenyl)-acetophenone, M.P. 121°–123°.

b.     4'-methylsulphonyl-2-(p-methoxyphenyl)-acetophenone

The mixture of 5 g of 4'-methylthio-2-(p-methoxyphenyl)-acetophenone, 100 ml of glacial acetic acid and 10 ml of 30% hydrogen peroxide is stirred for 22 hours at 20°–25°, and subsequently poured on to 700 ml of water. The white crystals are filtered off under suction, and recrystallised from a little alcohol, M.P. 162°–163°.

c. 4-methylsulphonyl-4'-methoxy-benzil

The mixture of 1.5 g of 4'-methylsulphonyl-2-(p-methoxyphenyl)-acetophenone, 0.6 g of selenium dioxide and 30 ml of glacial acetic acid is refluxed for 26 hours; it is subsequently filtered hot and poured on to 800 ml of water. The thus obtained crystals are filtered off under suction, dried and recrystallised from alcohol/pentane. The 4-methylsulphonyl-4'-methoxybenzil melts at 131°–133°.

EXAMPLE 13

The following compounds were produced analogously to Example (1a):

2-isopropyl-4(5)-(p-methoxyphenyl)-5(4)-(p-tolyl)-imidazole, M.P. 200°–201°, from 12.7 g of 4-methoxy-4'-methylbenzil and 3.96 g of isobutyraldehyde;

2-(1-methylpropyl)-4,5-bis(p-methoxyphenyl)-imidazole, M.P. 170°–171°, from 13.5 g of p-anisil and 4.73 g of 1-methylbutyraldehyde;

2-(1-ethylpropyl)-4,5-bis-(p-methoxyphenyl)-imidazole, M.P. 168°–169°, from 13.5 g of p-anisil and 5.5 g of 1-ethyl-butyraldehyde;

2-cyclopentyl-4,5-bis-(p-methoxyphenyl)-imidazole, M.P. 170°–172°, from 13.5 g of p-anisil and 5.5 g of cyclopentanecarboxaldehyde;

2-cyclobutyl-4,5-bis-(p-methoxyphenyl)-imidazole, M.P. 176°–178°, from 13.5 g of p-anisil and 4.62 g of cyclobutylcarboxaldehyde;

2-tert.butyl-4(5)-(p-methoxyphenyl)-5(4)-(o-chlorophenyl)-imidazole, M.P. 188°–190°, from 13.7 g of 4-methoxy-2'-chlorobenzil and 4.73 g of pivalaldehyde;

2-tert.butyl-4(5)-(p-methoxyphenyl)-5(4)-(m-chlorophenyl)-imidazole, M.P. 169°–171°, from 13.7 g of 4-methoxy-3'-chlorobenzil and 4.73 g of pivalaldehyde; 2-tert.butyl-4(5)-(p-methoxyphenyl)-5(4)-(p-chlorophenyl)-imidazole, M.P. 148°–150°, from 13.7 g of 4-methoxy-4'-chlorobenzil and 4.73 g of pivaldehyde;

2-isopropyl-4(5)-(p-methoxyphenyl)-5(4)-(m-chlorophenyl)-imidazole, M.P. 167°–170°, from 13.7 g of 4-methoxy-3'-chlorobenzil and 3.96 g of isobutyraldehyde.

What is claimed is:

1. A compound of the formula

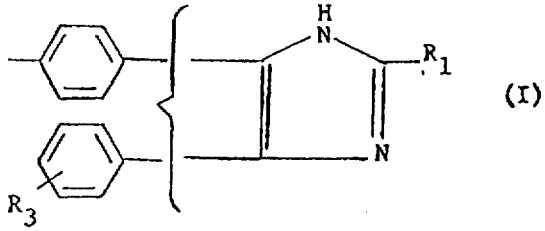

wherein
R₁ is alkyl of 2 to 6 carbon atoms or cycloalkyl of 3 to 6 carbon atoms,
R₂ methoxy, is methoxy methyl, hydroxy or methylsulfonyl, and
R₃ is methoxy, methyl, hydrogen or chloro, or a pharmaceutically acceptable acid addition salt thereof.

2. A compound according to claim 1 which is 2-ethyl-4,5-bis-(p-methoxyphenyl)-imidazole.

3. A compound according to claim 1 which is 2-isopropyl-4,5-bis-(p-methoxyphenyl)-imidazole.

4. A compound according to claim 1 which is 2-cyclopropyl-4,5-bis-(p-methoxyphenyl)-imidazole.

5. A compound according to claim 1 which is 2-tert.butyl-4(5)-[p-(methylsulfonyl)-phenyl-]5(4)-phenyl-imidazole.

6. A compound according to claim 1 which is 2-tert.butyl-4(5)-(p-hydoxyphenyl)-5(4)-phenyl-imidazole.

7. A compound according to claim 1 which is 2-tert.butyl-4,5-bis-(p-tolyl)-imidazole.

8. A compound according to claim 1 which is 2-tert.-butyl-4(5)-(p-methoxyphenyl)-5(4)-phenyl-imidazole.

9. A compound according to claim 1 which is 2-tert.butyl-4(5)-(p-methoxyphenyl)-5(4)-(m-tolyl)-imidazole.

10. A compound according to claim 1 which is 2-tert.butyl-4(5)-(p-methoxyphenyl)-5(4)-(o-tolyl)-imidazole.

11. A compound according to claim 1 which is 2-tert.-butyl-4(5)-(p-tolyl)-5(4)-phenyl-imidazole.

12. A compound according to claim 1 which is 2-isopropyl-4(5)-phenyl-5(4)-(p-methoxyphenyl)-imidazole.

13. A compound according to claim 1 which is 2-isopropyl-4(5)-(p-tolyl)-5(4)-(p-methoxyphenyl)-imidazole.

* * * * *